United States Patent [19]

Myers

[11] Patent Number: 4,491,336

[45] Date of Patent: Jan. 1, 1985

[54] FLUID CONNECTION APPARATUS

[75] Inventor: Allen D. Myers, Decatur, Ill.

[73] Assignee: Caterpillar Tractor Co., Peoria, Ill.

[21] Appl. No.: 446,742

[22] Filed: Dec. 3, 1982

[51] Int. Cl.³ .............................................. B60T 5/00
[52] U.S. Cl. .................................... 280/93; 137/351; 188/71.6
[58] Field of Search .................. 280/93, 421; 180/252; 137/351, 355.16, 355.17, 355.18; 188/71.6, 264 D, 264 E, 264 P

[56] References Cited

U.S. PATENT DOCUMENTS

| | | | |
|---|---|---|---|
| 3,600,012 | 8/1971 | Stafford | 285/413 |
| 3,627,155 | 4/1970 | Van Der Zyl | 137/355.17 X |
| 3,941,219 | 3/1976 | Myers | 188/71.6 X |
| 4,320,783 | 3/1982 | Neal et al. | 137/351 X |

OTHER PUBLICATIONS

*Taking Care In Installing Flexible Hose,* Commercial Car Journal, Sep. 1958, pp. C2 & C3.
*Auto Mechanics Fundamentals,* The Goodheart Willcox Co., Inc., 1969, p. 341.
*Introducing The New HD1200M-1 Dump Truck,* Komatsu Ltd., Feb. 1981.

*Primary Examiner*—John A. Pekar
*Attorney, Agent, or Firm*—William C. Perry

[57] ABSTRACT

In the very large hauling vehicles (10) it is desirable to provide the front and rear wheels (20,16) with multiple disc brake assemblies (32) that have retarding capabilities. It has long been a problem to route a conduit (34,36) of a size large enough to carry the required volume of cooling oil, between a frame (12) of the vehicle (10) and the front wheels (20). The front wheels (20) present a particular problem in that they usually move vertically along an axis (28) of a suspension strut (22) to which they are mounted, as well as pivoting about the axis (28) for steering functions. A conduit (34,36) that has sufficient length to accommodate the extremeties of the compound motion will often come in rubbing contact with the surrounding structural members which results in wear and premature failure of the conduit.

The fluid connecting apparatus (33) of this invention utilizes a mounting arrangement for flexible conduits (34,36) that provides sufficient volume of cooling oil to allow the front brakes (32) of a vehicle (10) to be utilized for retarding. The conduits (34,36) are mounted directly between the frame (12) and the wheels (20) utilizing specific mounting parameters to direct the slack portions (130,132) of the conduits (34,36) away from surrounding structures (12,20). They also utilize a twist or dressing, that exists in the conduits (34,36) as a result of their mounting, to guide the slack portion (130,132) away from the surrounding structure during the extremes of the compound movement of the wheels (20) and struts (22).

19 Claims, 6 Drawing Figures

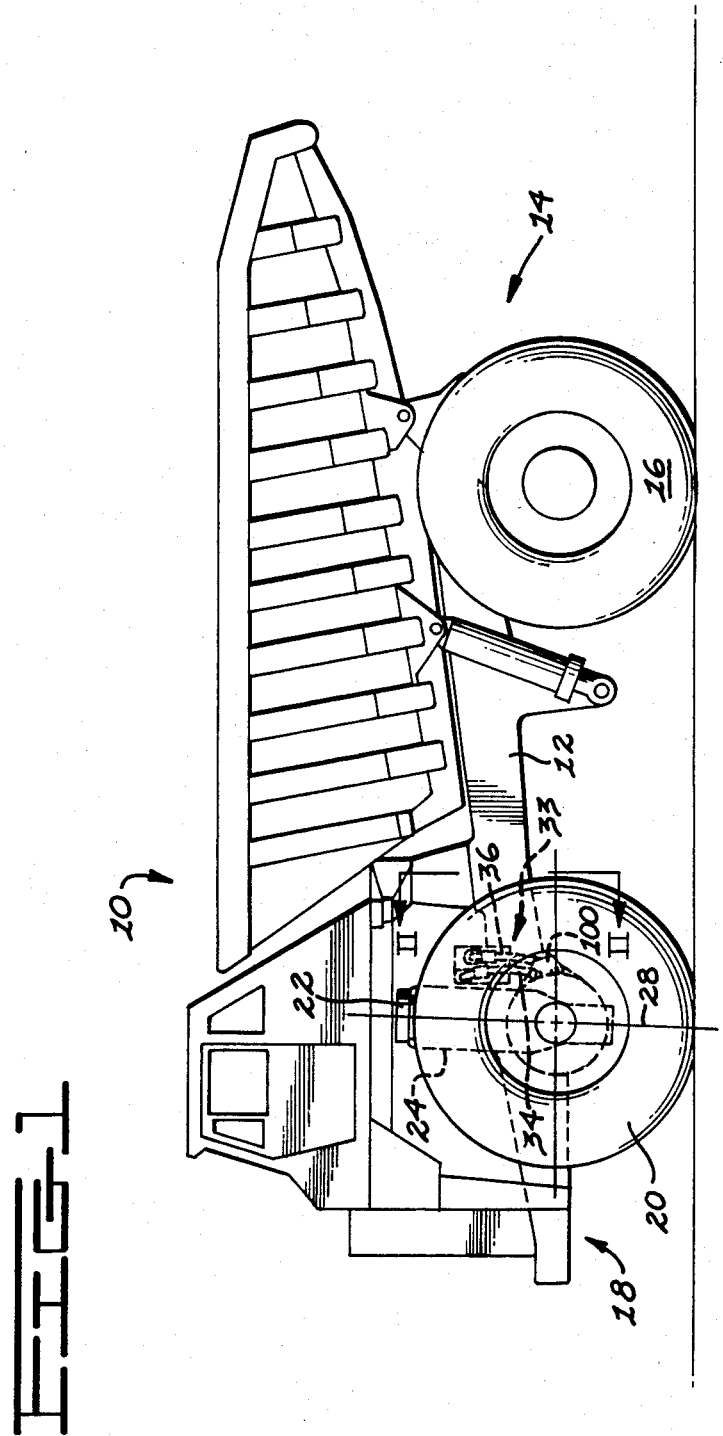

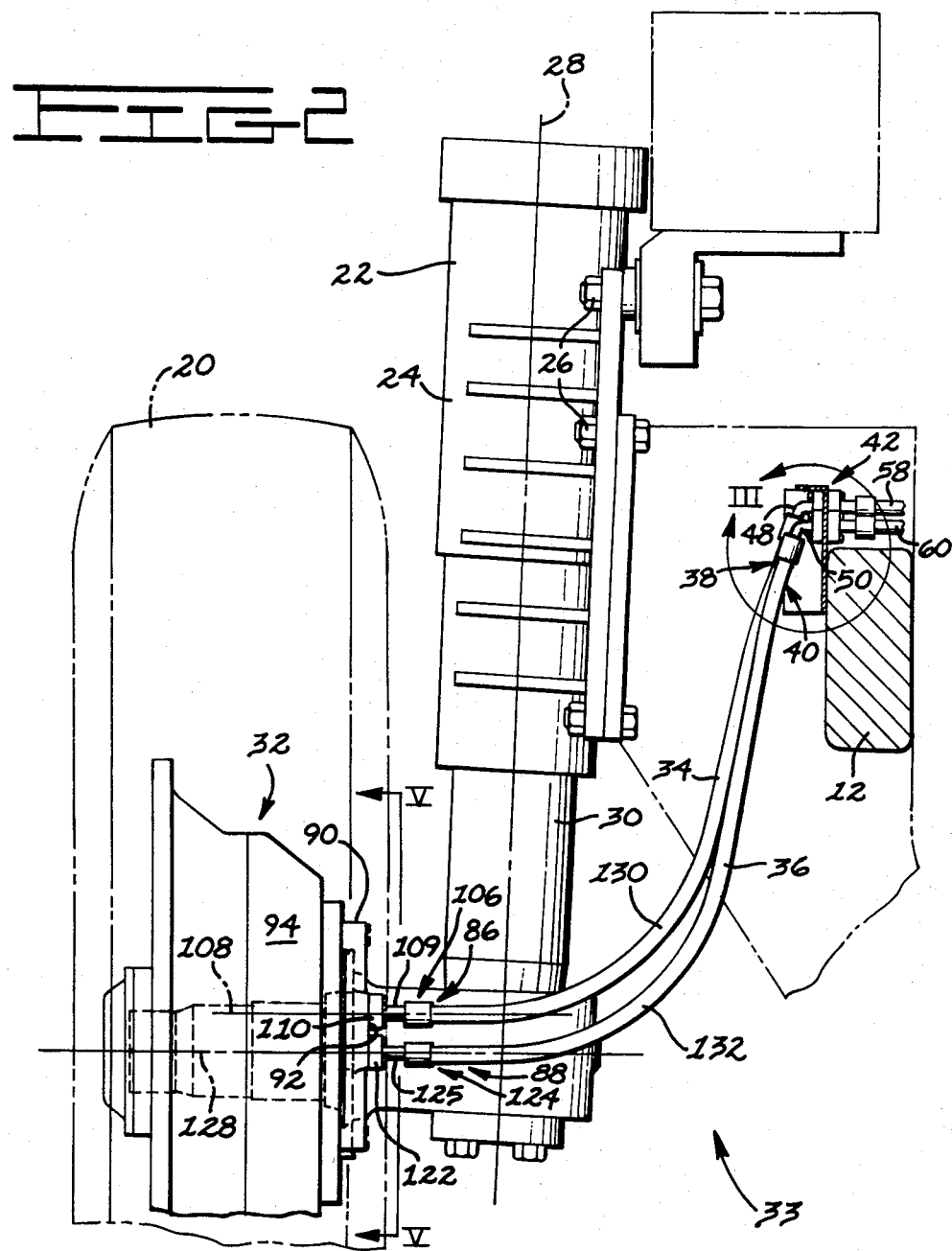

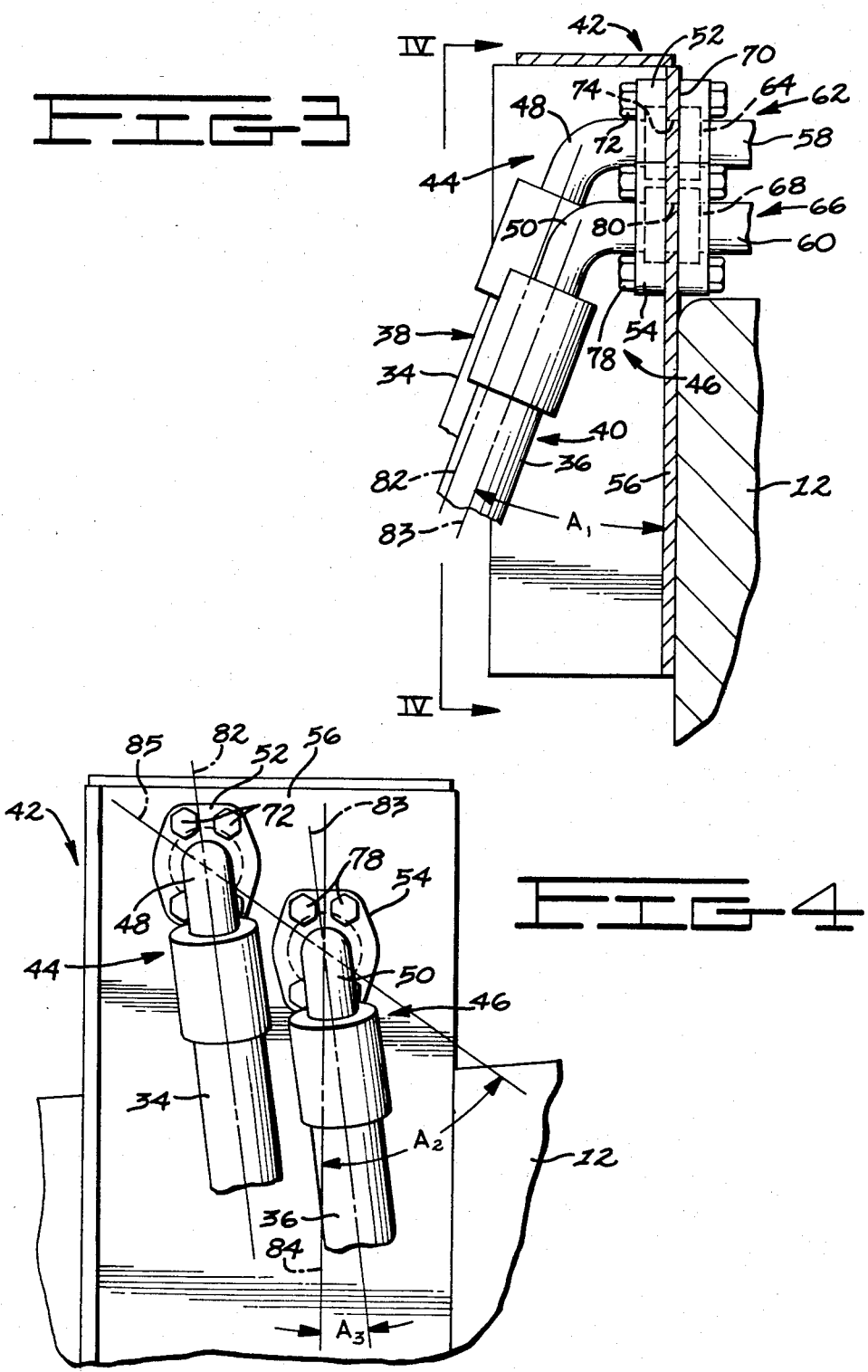

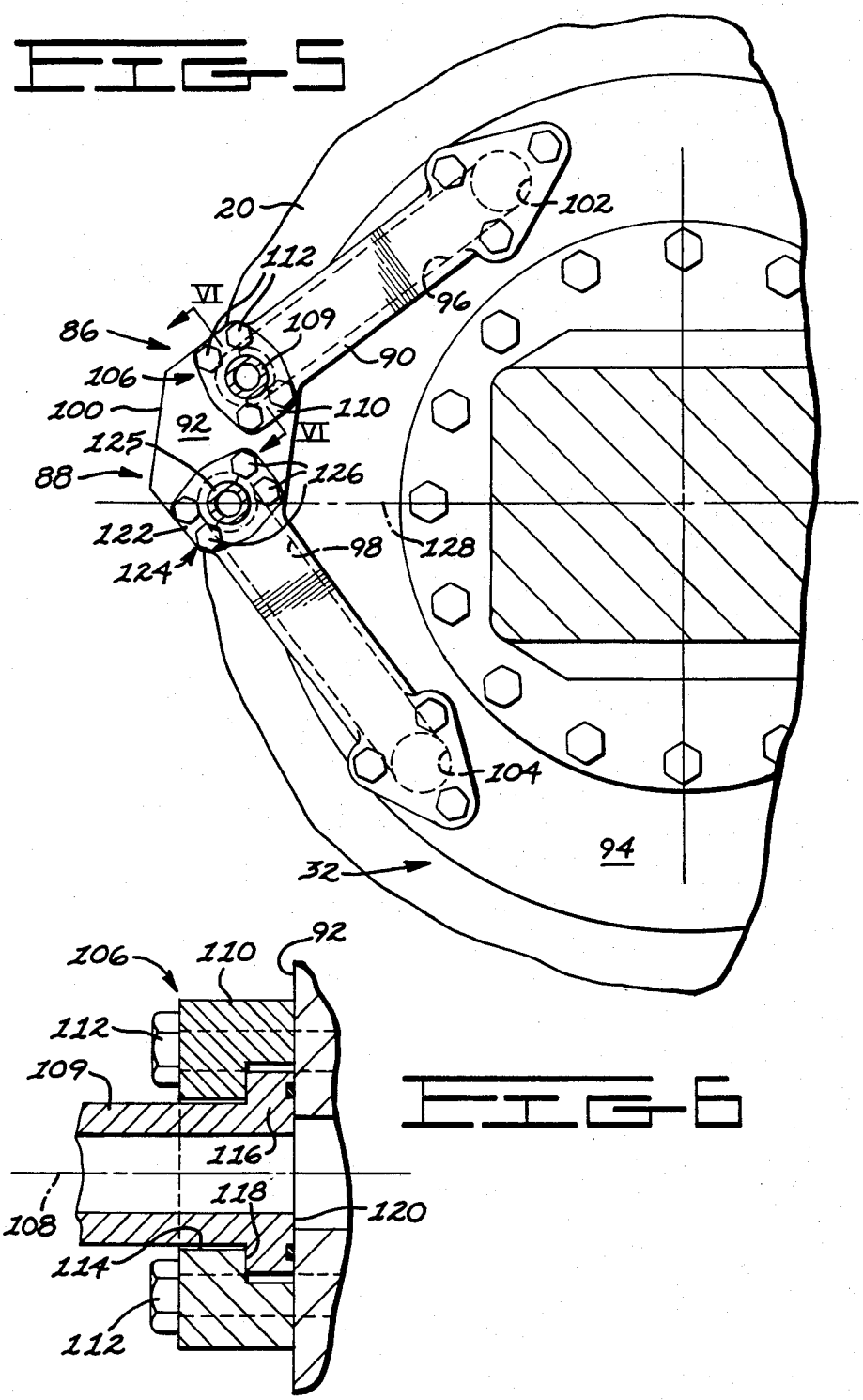

FLUID CONNECTION APPARATUS

DESCRIPTION

1. Technical Field

This invention relates generally to flexible fluid connections and more particularly to a fluid connection between a vehicle frame and a steerable wheel.

2. Background Art

It has been a recent trend in the mining industry and other related industries to utilize off-highway trucks that are very large in both size and hauling capacity. However, as the size and capacity of the vehicle increases so must the braking capacity required to effectively stop such large vehicles.

It is common practice to use a multiple disc brake assembly of the type disclosed in U.S. Pat. No. 3,941,219 to brake the rear wheels of a vehicle. In addition to braking, the multiple disc brake also provides a speed retarding function for the vehicle. Speed retarding is used most frequently when the vehicle traverses a long or a steep downgrade. Instead of requiring application of the brakes through the foot brake, which over an extended period of time would cause a severe heat build up and/or extensive wear, the retarder is activated to apply a selected amount of braking automatically. A predetermined amount of braking pressure is applied to the multiple disc brake to achieve the desired vehicle speed, while at the same time, a large amount of cooling oil is circulated in the brake assembly to dissipate the heat. In the meantime, the operator's foot brakes remain released.

Normally, the front brakes on an off-highway truck are of the internally expanding, drum-type brake or a caliper disc brake. The front brakes are used as service brakes with the majority of the braking force being generated by the rear brakes.

Again, due to the increasing size of the vehicles, it has become desirable to provide a multiple disc brake for the front wheels of a vehicle to increase the overall braking capacity of the vehicle. Such an arrangement is shown in the Komatsu Ltd. Product Bulletin publication, No. PB-E-023-1E0 dated February 1981. The publication discloses that both front and rear brakes are oil cooled, multiple disc brakes with the rear brakes also acting as retarders.

While the front wheels of a large off-highway truck have been provided with multiple disc brakes, the use of the front brakes in a retarding capacity is heretofore unknown. The main reason for this resides in the difficulty that exists in the routing of the large volume of fluid that is required to cool the brakes. Since the front wheels of a truck are most generally suspended from the frame by a suspension strut, a relatively large range of vertical movement must be accommodated. In addition to the vertical movement, the steering movement of the front wheels, or pivoting of the wheel about the axis of the suspension strut must also be accommodated. Thus, a problem exists in the routing of the hoses or conduits that are necessary to supply the cooling oil to the brakes and still accommodate the large amount of compound movement between the wheel and the frame.

In some applications, swivel hose connections have been provided on the frame to allow for the relative movement of the wheel. This has been proven unsuccessful because, as previously stated, the relative movement is of a compound nature. The swivels can only be effective for relative movement primarily in a single plane. As movement occurs in a plane other than that in which the swivel is mounted, or both planes simultaneously, the swivel assembly will experience side loading and will eventually develop a leak. Also, since the swivel may be subjected to a very dirty or muddy environment, the swiveling action may be rendered inoperative which will also result in failure of the swivel connection.

Other fluid connections for general service brake functions provide a pair of hose junction blocks that are solidly mounted to both the frame and the lower inside portion of the suspension strut. A pair of hoses are then routed between the frame and the wheel. One hose extends between the frame and the junction block on the strut. The second hose extends between the junction block and the wheel. Since the wheel is rigidly mounted to the lower portion of the suspension strut, the lower portion acts as a king pin and rotates therewith about the strut axis when steering occurs. As a result, all of the relative movement must be accommodated by the relatively short hose that extends between the frame and the junction block on the strut. Given the large conduit diameter that is required to communicate the large volume of cooling oil to a brake for retarding capabilities, the linear and rotational motion, combined with the shortness of the hose, would result in structural damage to the hose.

Another disadvantage resides in the location of the junction block. Since it must allow for equal amounts of pivotal movement, both fore and aft, the location of the junction block must be on the side of the strut, closest to the frame. In this location, the junction block is subject to damage from debris or other objects that are inherent in the type of terrain that an off-highway truck would encounter.

Yet another disadvantage exists in the extra expense required in having to use an additional hose, another junction block, and the necessary hardware to complete the connection. The additional junction block and hose connections also increase the potential for leakage.

The present invention is directed to overcoming one or more of the disadvantages set forth above.

DISCLOSURE OF THE INVENTION

In one aspect of the present invention, a fluid connection apparatus is provided between a frame and a member that is movable relative to the frame. A normally flexible conduit has a first end rigidly connected to the frame at a preselected angle. The second end is rigidly connected to the movable member in a manner which allows a slack portion of the conduit to extend between the two members. The second end of the conduit is secured to the movable member at a preselected angular relationship which imparts a degree of rigidity to the slack portion of the conduit. In doing so, the slack portion of the conduit is maintained in a predisposed, non-interfering position with respect to the frame and the structure of the movable member.

In another aspect of the invention, a fluid connecting apparatus for a vehicle is provided. The vehicle has a frame to which a suspension strut is mounted along an upright axis. A wheel is mounted to the suspension strut and moves with the strut and also rotates about the axis of the strut. The connecting apparatus includes a flexible conduit that has an angled coupling on one end that is in turn mounted to the frame at an oblique angle. Another coupling member on the other end of the conduit is mounted to a surface of the wheel. The coupling extends from the mounting surface at a substantially horizontal attitude in a direction that is normal to the mounting surface. The mounting surface is positioned on the wheel so as to be above the horizontal centerline of the wheel and to the rear of the axis of the suspension strut.

In order to provide a large volume of fluid communication between the frame and the wheel, the conduits must have large diameters. They also must accommodate a large amount of relative movement between the two members in a relatively short span. It is a problem to provide enough hose to accommodate the extremes of relative motion of the wheel and still prevent the slack portion of the conduit from contacting any of the surrounding structure. The subject invention provides a direct connection between the frame and the wheel member. It also allows enough of a slack portion in the conduit to accommodate the relative movement without overstressing the structural fibers of the conduit. The specific locations of the ends of the conduit with respect to the frame and the wheel, are such that the slack portion is actually guided by its own rigidity away from interference with any surrounding structural members.

BRIEF DESCRIPTION OF THE DRAWINGS

FIG. 1 is a diagrammatic side view of a vehicle that embodies the principles of the present invention;

FIG. 2 is a diagrammatic, fragementary sectional view taken along lines II—II of FIG. 1;

FIG. 3 is a diagrammatic, fragmentary enlargement of the conduit connection shown in FIG. 2 within circle 3;

FIG. 4 is a diagrammatic, fragementary side view of FIG. 3 taken along lines IV—IV of FIG. 3;

FIG. 5 is a diagrammatic, fragmentary sectional view taken along lines V—V of FIG. 2; and FIG. 6 is a diagrammatic, fragmentary sectional view taken along lines VI—VI of FIG. 5.

BEST MODE FOR CARRYING OUT THE INVENTION

Referring to the drawings, particularly FIG. 1, a vehicle 10 such as an off-highway truck, is shown. The vehicle has a frame 12 that is supported at a rear portion 14 thereof by a pair of wheels 16 (one shown) that are disposed on each side of the frame. A front portion 18 of the frame is also supported by a pair of wheels 20 (one shown) which are also disposed on each side of the frame.

Each of the front wheels 20 are mounted to the frame 12 by a suspension strut 22. The suspension strut has a cylinder portion 24 that is rigidly attached to frame 12 by bolts 26 along an upright axis 28. A piston, or rod member 30, extends from the cylinder portion to rigidly mount the wheel 20. The piston member is adapted for relative movement within cylinder 24 in response to the movement of wheel 20 over uneven ground. In addition to moving up and down along the strut axis 28, the wheel and piston are also adapted for rotation about the axis. The rotation occurs as a result of the normal steering functions of the vehicle.

As best shown in FIGS. 2 and 5, a brake assembly 32 is associated with each of the wheels 16 and 20 for selectively stopping the rotation thereof. Each brake assembly is of the multiple disc type and is oil cooled. The fluid necessary to cool each of the brake assemblies 32 is delivered from and returned to a fluid reservoir (not shown) by a fluid connecting apparatus shown generally flexible at 33. The fluid connecting apparatus includes a first flexible conduit 34 that delivers fluid to the brake assemblies 32 and a second flexible conduit 36 that returns the fluid to the reservoir.

The conduits 34 and 36 each have a first end portion 38 and 40 that is secured to a bracket assembly 42. The bracket assembly extends upwardly from the frame 12 in a substantially vertical plane. A pair of solid tubular coupling means 44 and 46 are affixed to the first ends 38 and 40 of the conduits 34 and 36 for the respective mounting of each of the conduits to the bracket assembly 42. The couplings each have an angled stem portion 48 and 50 that terminates at a flanged portion 52 and 54 that is rigidly secured thereto. The flanged portions of both conduits are in turn mounted to a first surface 56 of bracket assembly 42.

A second pair of conduits 58 and 60 extend from a source of pressurized fluid (not shown). A coupling 62, which has a flanged end portion 64, is attached to the end of conduit 58. Another coupling 66 being substantially identical to coupling 62 is attached to the end of conduit 60 and also has a flanged end portion 68. The flanged ends 64 and 68 of the conduits are mounted to a second surface 70 of bracket assembly 42. The flange 64 of conduit 58 is mounted to the bracket assembly in directly opposing relationship to the flanged portion 52 of conduit 34. Both flanges are mounted to the bracket assembly 42 by a common mounting means 72. Being mounted in this manner, the bracket assembly 42 acts as a junction block to establish fluid communication between the conduits 34 and 58 via a common passage 74 located in the bracket between the flanged portions 52 and 64. Likewise, the flanges 54 and 68 are mounted to the bracket assembly 42 by common mounting means 78 to establish fluid communication between the conduits 36 and 60 through a second common passage 80 positioned in the bracket assembly between the flanges.

As previously described, the flanged portions 52 and 54 of couplings 44 and 46 respectively, are secured along the vertically extending surface 56 of bracket assembly 42. Each of the stemmed portions 48 and 50 of the coupling and the respective first end portions 38 and 40 of conduits 34 and 36 define a pair of parallel axes 82 and 83 that extend downwardly and toward the wheel 20. The axes each form an angle $A_1$, with the bracket assembly 42, that is within a range of 15 to 45 degrees, as viewed in FIG. 3, and preferably an optimum angle of 27 degrees.

In FIG. 4 of the drawings, it can be seen that the conduits 34 and 36 are positioned generally side by side on bracket assembly 42. The flanged portion 54 of conduit 36 is located to the rear of the flanged portion 52 of conduit 34 and is elevationally lower. The conduits are thus mounted along a centerline 85 that forms an angle $A_2$ between the two flanges. The angle $A_2$ falls within a range of 20 to 45 degrees as measured from a vertical plane 84. Also the axes 82 and 83 of the conduits remain parallel as viewed in FIG. 4 and both form an angle $A_3$ that is directed to the rear portion 14 of the frame 12. The angle $A_3$ ranges between 0 and 15 degrees as measured from the vertical plane 84 and has an optimum angle of approximately 7.5 degrees.

A second end 86 and 88 of the conduits 34 and 36 are connected to the brake assembly 32 via a manifold 90. The manifold is positioned to form an inner mounting surface 92 on the wheel 20 which comprises a portion of a housing 94 of the brake assembly. The manifold has a first and second internal passage 96 and 98 that diverge from a common mounting junction 100. The conduits 34 and 36 are attached to the manifold at junction 100. Conduit 34 is mounted in fluid communication with the first internal passage 96 and the pressurized fluid in the conduit is delivered to a port 102 in the brake housing. From the port it is dispersed within the brake assembly to provide cooling for the various internal components (not shown) of the brake. Conduit 36 is mounted in fluid communication with the second internal passage 98 of the manifold 90. The cooling fluid is drawn from a drain port 104 in the brake housing 94 through the second internal passage 98 and into conduit 36 for its evacuation from the brake housing.

The connection between the conduit 34 and the manifold junction 100 (FIG. 6) includes a coupling 106 that extends from the manifold along a generally horizontal axis 108. The coupling has a straight stem portion 109 that is sealingly secured to the manifold junction 100 by a split mounting flange 110 which is generally of the type disclosed in U.S. Pat. No. 3,600,012, which is assigned to the assignee of the present invention. The flange is in turn fastened to the manifold junction by a plurality of mounting bolts 112. The stem passes through a centrally disposed aperture 114 formed in the flange 110. The stem terminates at an end portion 116 that has an enlarged diameter. The end portion 116 bears against a shoulder 118 formed on an inner surface 120 of the flange 110. When the mounting bolts 112 are tightened, the shoulder will hold the enlarged end portion 116 of the stem in sealing engagement with the junction 100. Conversely, when the mounting bolts are not completely tightened, the stem and the conduit may be rotated about the axis 108 relative to the flange 110.

The connection between the second conduit 36 and the manifold junction 100 is substantially identical to that of the conduit 34. A second split flange 122 mounts a coupling 124 of conduit 36 to the manifold junction 100. Like coupling 106, coupling 124 has a straight stem portion 125 sealingly mounted to the junction by a plurality of mounting bolts 126. The second conduit 36 is mounted on the manifold junction 100 at a location that is spaced vertically below that of the first conduit 34, both conduits being generally on the same vertical centerline.

The manifold 90 is positioned on the brake housing 94 such that the manifold junction 100 is above a horizontal centerline 128 that passes through wheel 20. In addition, the manifold junction is positioned rearwardly of the strut axis 28.

Between the first and second ends of each conduit 34 and 36 a respective slack portion 130,132 is formed which is best illustrated in FIG. 2. Each slack portion forms a flexible loop of conduit that will increase and diminish in size as the conduit accommodates the variable motion of the wheel 20 and the suspension strut 22. While the slack portion is flexible enough to accommodate the variable motion, it is also rigid enough to be held in a predetermined plane between the frame 12 and the wheel 20.

INDUSTRIAL APPLICABILITY

As previously described, the movement of the front wheels 20 with respect to the vehicle 10, is that of a compound nature. Since each wheel 20 moves along axis 28 and also pivots thereabout, the conduits 34 and 36 must have adequate length and be appropriately mounted to accommodate such movement. It is very important that contact between the conduits and the surrounding structure be avoided to prevent undue wear and premature failure of the conduits. To accomplish this, the conduits are mounted to the frame to extend downwardly and toward the wheel at the prescribed optimum angle $A_1$ (FIG. 3). Likewise, the conduits are both angled toward the rear of the vehicle within the prescribed range of angle $A_3$ (FIG. 4).

The mounting of the conduits 34 and 36 to the wheel 20 also requires very specific positioning. The connection between the couplings 106 and 124 and the manifold junction 100 is positioned behind the axis 28 of the suspension strut 22 and above the horizontal centerline 128 of the wheel 20. The particular parameters that exist in the mounting of the conduits allows the slack portions 130 and 132 that extend between the wheel 20 and the frame 12 to be naturally directed in a predetermined plane, away from the surrounding structure during the majority of operational motion of the wheels 20.

As the wheels 20 and the piston 30 of the suspension struts 22 approach their maximum motion extremities, the amount of slack in the conduits 34 and 36 will be increased and diminished. In order to maintain the slack portion of the conduits in a non-interfering position with respect to the surrounding structure, a twist or dressing may be applied to the conduits. In doing so, the conduits actually have a built in bias that will direct the slack portions of the conduits away from the various structures.

The twist may be placed in the conduit 34, for example, by loosening mounting bolts 112 of the split flange 110. The straight stem coupling 106 and thus the second end portion 86 of the conduit 34 for example, may then be rotated with respect to the flange 110 and the first end portion 38 of the conduit. The mounting bolts 112 may then be retightened to capture the twist in the conduit. The twist serves to alter the motion of the slack portion 130 of the conduit 34, causing it to move away from the surrounding structural members. The amount of motion and the direction of motion may be adjusted by the corresponding amount and direction of relative movement between the coupling 106 and split flange 110. Conduit 136 may be adjusted in a similar fashion to achieve the desired motion.

By utilizing the particular location parameters required in mounting each end of the conduits 34 and 36, the conduits may extend directly between the frame 12 and the wheels 20. In addition, they may be of a very large diameter to carry a large volume of cooling oil which is needed when a multiple disc brake assembly 32 also functions as a retarder. Finally, the conduits may be of a sufficient length and have sufficient slack portions 130 and 132 to accommodate the full range of the extremes of compound movement that occurs between the wheels 20 and the suspension struts 22 and at the same time be mounted to avoid the surrounding structure to preserve the life of the conduits.

Other aspects, objects and advantages of this invention can be obtained from a study of the drawings, the disclosure and the appended claims.

I claim:
1. A fluid connection apparatus (33), comprising:
   a frame (12);
   a member (20) mounted to the frame (12) that is movable with respect to the frame (12);
   a normally flexible conduit (34,36) having first and second end portions (38,40,86,88) and a slack por- tion (130,132) of the conduit (34,36) defined between the end portions (38,40,86,88);

first means (44,46) for rigidly connecting the first end portion (38,40) of the conduit (34,36) to the frame (12) in a preselected angular relationship (A₁,A₂,A₃) thereto; and second means (106,124,110,122) for rigidly connecting the second end (86,88) of the conduit (34,36) to the movable member (20), said second means (106,124,110,112) and said second end portion (86,88) of the conduit (34,36) being rotatable with respect to the movable member (20) and the first end portion (38,40) of the conduit (34,36) to create a twist or preload in the conduit (34,36) to control the disposition thereof by imparting a degree of rigidity to the slack portion (130,132) to maintain it in a predisposed, non-interfering position with respect to the frame (12) and the movable member (20) during extension and relaxation of the conduit (34,36) as a result of movement between the movable member (20) and the frame (12).

2. The apparatus (33) of claim 1 wherein the preselected angular relationships (A₁,A₂,A₃) of the first and second connecting means (44,46,106,124, 110,112) dispose the slack portion (130,132) of the conduit (34,36) such that it forms a flexible loop that lies in a predetermined plane that extends between the frame (12) and the movable member (20).

3. The apparatus (33) of claim 1 wherein the frame (12) is that of a vehicle (10) and the movable member (20) further includes a steerable wheel (20) that is mounted to the frame (12) by a suspension strut (22) for movement relative to the frame (12) along an upright axis (28) of the strut (22) and rotational movement about the axis (28).

4. The apparatus (33) of claim 3 wherein the second means (106,124,110,122) includes a fluid manifold (90) and forms a mounting surface (92) on a portion of the wheel (12) adjacent the frame (12) and is positioned on the wheel (20) at a location that is above a horizontal centerline (128) of the wheel (20) and rearward of the axis (28) of the strut (22).

5. The apparatus (33) of claim 4 wherein the second means (106,124,110,122) further includes a straight connecting stem (109,125) that engages the mounting surface (92) and extends therefrom at an attitude that is normal thereto.

6. The apparatus (33) of claim 1 wherein the first means (44,46) includes a fluid coupling (44,46) attached to the frame (12) and the preselected angle (A₃) at which the first means (44,46) mounts the conduit (34,36) to the frame (12) is within a range of approximately 0 to 15 degrees.

7. The apparatus (33) of claim 1 wherein the first means (44,46) further includes a tubular connecting stem (48,50) having an angle (A₁) formed therein that is sufficient for mounting the first end (38,40) of the conduit (34,36) at an angle to the frame (12) that is within a range of 15 to 45 degrees and directs the conduit downwardly and toward the movable member (20).

8. A fluid connecting apparatus (33), comprising:
a vehicle frame (12);
a steerable wheel member (20) mounted to the frame (12) by a suspension strut (22) for movement relative to the frame (12) along an upright axis (28) of the strut (22) and rotational movement about the axis (28);

a manifold (90) having a mounting surface (92) defined thereon and being mounted on a portion of the wheel (20) adjacent the frame (12) at a location that is above a horizontal centerline (128) of the wheel (20) and rearward of the axis (28) of the strut (22);

a normally flexible conduit (34,36) having first and second end portions (38,40,86,88) and a slack portion (130,132) of the conduit (34,36) defined between the end portions (38,40,86,88);

first means (44,46) for rigidly connecting the first end portion (38,40) of the conduit (34,36) to the frame (12) in a preselected angular relationship (A₁,A₂,A₃) thereto; and second means (106,124,110,122) for rigidly connecting the second end (86,88) of the conduit (34,36) to the wheel member (20) including a straight connecting stem (109,125) engageable with said mounting surface (92) and extending therefrom at an attitude that is normal thereto, said straight connecting stem (109,125) and the second end portion (86,88) of the conduit (34,36) being rotatable with respect to the mounting surface (92) and the first end portion (38,40) of the conduit (34,36) to create a twist or preload in the conduit (34,36) to control the disposition thereof with respect to the frame (12) and the wheel (20) as the relative movement occurs therebetween.

9. In a fluid connecting apparatus (33) adapted for use in a vehicle (10) including a frame (12), a suspension strut (22) mounted to the frame (12) about an upright axis (28), a wheel (20) having a mounting surface (92) and being mounted to the suspension strut (22) for vertical movement along and rotational movement about the axis (28); the improvement comprising:

a flexible conduit (34) having first and second end members (38,86);

a first coupling member (44) having preselected angle (A₁) and being positioned between the first end member (38) of the conduit (34) and the frame (12) for mounting the conduit (34) to the frame (12) at a preselected oblique angle (A₃); and a second coupling member (106) positioned between the second end member (86) of the conduit (34) and the mounting surface (92) of the wheel (20), said second coupling member (106) extending therefrom at a substantially horizontal attitude (108) in a direction normal to the mounting surface (92), said mounting surface being located above a horizontal centerline (128) of the wheel (20) and rearwardly of the axis (28) of the suspension strut (22), one of the first and second coupling members (44,106) being movable with respect to the other to provide a preloading of the flexible conduit (34) and a preselected degree of twist in the conduit (34) between the coupling members (44,106).

10. The connecting apparatus (33) of claim 9 wherein the preselected angle (A₁) of the first coupling member (44) mounted to said frame (12) is within a range of approximately 15 to 45 degrees.

11. The connecting apparatus (33) of claim 9 wherein the preselected oblique angle (A₃) at which the conduit (34) is mounted to the frame (12) is within a range of approximately 0 to 15 degrees and is directed rearwardly of the strut axis (28).

12. The connecting apparatus (33) of claim 9 wherein the preselected angle (A₁) of the first coupling member (44) positions the flexible conduit (34) such that it extends downwardly from its mounting to said frame (12) and toward the wheel (20).

13. The connecting apparatus (33) of claim 9 further including:
    a second flexible conduit (36) having first and second end members (40,88);
    a third coupling member (46) having a preselected angle ($A_1$) and being positioned between the first end member (40) of the second conduit (36) and the frame (12) for releasably mounting the second conduit (36) thereto at a preselected oblique angle ($A_3$); and
    a fourth coupling member (124) positioned between the second end member (88) of the second flexible coupling (36) and the mounting surface (92) of the wheel (20) for releasably mounting the second conduit (36) to the wheel (20), said fourth coupling member (124) extending therefrom at a substantially horizontal attitude in a direction normal to the mounting surface (92), said mounting surface (92) being located above the horizontal centerline (128) of the wheel (20) and rearwardly of the axis (28) of the suspension strut (22).

14. The connecting apparatus (33) of claim 13 wherein the preselected angle ($A_1$) of the third coupling member (46) and the preselected oblique mounting angle ($A_3$) are substantially the same as those of the first coupling member (44).

15. The connecting apparatus (33) of claim 13 wherein the fourth coupling member (124) extends from the mounting surface (92) at an attitude that is substantially the same as that of the second coupling member (106).

16. The connection apparatus of claim 13 wherein the third coupling member (46) is mounted to the frame (12) below the first coupling member (44) and spaced laterally to the rear of the first coupling member (44) to be positioned therefrom, along a centerline (85) at an angle ($A_2$) that is within a range of approximately 20 to 45 degrees.

17. The connection apparatus (33) of claim 13 wherein the second and the fourth coupling members (106,124) are positioned in generally vertical spaced relationship to each other.

18. The connection apparatus (33) of claim 9 wherein a multiple disc brake assembly (32) is housed within the wheel (20) for selectively stopping the rotation thereof.

19. The connection apparatus (33) of claim 18 wherein the first and second conduits (34,36) are supply and return lines for cooling fluid for the brake assembly (32).

* * * * *